United States Patent
Wang et al.

(10) Patent No.: US 11,429,498 B2
(45) Date of Patent: Aug. 30, 2022

(54) SYSTEM AND METHODS OF EFFICIENTLY RESYNCING FAILED COMPONENTS WITHOUT BITMAP IN AN ERASURE-CODED DISTRIBUTED OBJECT WITH LOG-STRUCTURED DISK LAYOUT

(71) Applicant: VMware, Inc., Palo Alto, CA (US)

(72) Inventors: Wenguang Wang, Santa Clara, CA (US); Vamsi Gunturu, Palo Alto, CA (US); Enning Xiang, San Jose, CA (US); Eric Knauft, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 201 days.

(21) Appl. No.: 16/870,861

(22) Filed: May 8, 2020

(65) Prior Publication Data

US 2021/0349793 A1 Nov. 11, 2021

(51) Int. Cl.
*G06F 11/00* (2006.01)
*G06F 11/14* (2006.01)
*G06F 3/06* (2006.01)
*G06F 11/10* (2006.01)

(52) U.S. Cl.
CPC .......... *G06F 11/1471* (2013.01); *G06F 3/064* (2013.01); *G06F 3/0619* (2013.01); *G06F 3/0659* (2013.01); *G06F 3/0673* (2013.01); *G06F 11/1076* (2013.01)

(58) Field of Classification Search
CPC ............. G06F 11/1471; G06F 11/1076; G06F 3/0619; G06F 3/064
See application file for complete search history.

(56) References Cited

U.S. PATENT DOCUMENTS

| | | |
|---|---|---|
| 7,549,089 B1 | 6/2009 | Kimmel et al. |
| 8,595,595 B1 | 11/2013 | Grcanac et al. |
| 2003/0145270 A1 | 7/2003 | Holt |
| 2004/0128470 A1 | 7/2004 | Hetzler et al. |
| 2007/0180348 A1 | 8/2007 | Corbett et al. |
| 2008/0168225 A1 | 7/2008 | O'Connor et al. |
| 2008/0282105 A1 | 11/2008 | Dennadhayalan et al. |
| 2009/0083504 A1 | 3/2009 | Belluomini et al. |
| 2012/0079190 A1 | 3/2012 | Colgrove et al. |
| 2012/0084505 A1 | 4/2012 | Colgrove et al. |

(Continued)

*Primary Examiner* — Philip Guyton
(74) *Attorney, Agent, or Firm* — Fish & Richardson P.C.

(57) ABSTRACT

Methods, systems, and apparatus, including computer programs encoded on computer storage media, for resynchronizing data in a storage system. One of the methods includes determining that a particular disk of a capacity object of a storage system was offline for an interval of time, wherein the capacity object comprises a plurality of segments, and wherein the storage system comprises a segment usage table identifying a linked list of particular segments of the capacity object that are in use; determining a time point at which the particular disk went offline; determining one or more first segments of the capacity object that were modified after the time point, wherein determining one or more first segments comprises determining each segment of the segment usage table having a transaction ID that is larger than the time point; and resynchronizing, for each first segment, a portion of the particular disk corresponding to the first segment.

18 Claims, 6 Drawing Sheets

(56) References Cited

U.S. PATENT DOCUMENTS

| | | |
|---|---|---|
| 2014/0317479 A1 | 10/2014 | Candelaria |
| 2015/0095697 A1 | 4/2015 | Bonwick et al. |
| 2016/0170833 A1* | 6/2016 | Segura ................ G06F 11/1088 714/6.23 |
| 2017/0242587 A1 | 8/2017 | Blaum et al. |
| 2018/0341561 A1* | 11/2018 | Hutchison ........... G06F 11/1662 |
| 2019/0332480 A1* | 10/2019 | Kang ...................... G06F 11/28 |
| 2021/0349793 A1* | 11/2021 | Wang .................. G06F 11/1076 |

* cited by examiner

SYSTEM AND METHODS OF EFFICIENTLY RESYNCING FAILED COMPONENTS WITHOUT BITMAP IN AN ERASURE-CODED DISTRIBUTED OBJECT WITH LOG-STRUCTURED DISK LAYOUT

BACKGROUND

This specification generally relates to data storage virtualization.

A common architecture for data storage virtualization is a redundant array of independent disks (RAID), where multiple disk drives, also called simply "disks," are combined into a single logical unit for the purpose of data redundancy. There are multiple different RAID levels that each define a different procedure for distributing data across the multiple disks.

One common RAID level is RAID-1, where every item of data written to the storage system is copied, or "mirrored," at least once. For example, there might be two disks in a RAID-1 array, where all of the data written to the first disk is mirrored to the second disk. Thus, every disk except one in a RAID-1 array can fail and the system can restore the data without data loss. This fault tolerance comes at the cost of space efficiency and write efficiency. That is, with n disks, a RAID-1 array has a usable capacity of 1/nth the capacity of the array, and every write operation requires n operations to amplify the write across the array.

Another common RAID level is RAID-6, where multiple "primary" disks store data that is supported by two "parity" disks. A parity disk provides fault tolerance to the primary disks, so that if a primary disk fails, a system can restore the data of the failed primary disk without data loss. Typically there are two parity disks in a RAID-6 array, which allows for up to two disk failures, across the primary disks and the parity disks, without loss of data. A RAID-6 array employs block-level striping, where each disk is segmented into multiple blocks, and where logically sequential blocks are stored on different disks. The group of corresponding blocks in each of the disks of a RAID-6 array is called a "stripe," and the size of a single block is called the "stripe size" of the array.

As with RAID-1, the fault tolerance of RAID-6 comes at the cost of lower capacity and write efficiency. For instance, a RAID-6 array might have 4 primary disks and 2 parity disks. In this case, the usable capacity of the array is ⅔rds the capacity of the array. To write to a single block of a primary disk of the array requires 6 read and write operations: the system must i) read the current value of the block of the primary disk and the current values of the corresponding blocks of the two parity disks, ii) compute an update to the values of the blocks of the parity disks given the new data in block of the primary disk, and iii) write the new data to the block of the primary disk and the new values to the blocks of the two parity disks.

In some RAID-6 implementations, a storage system can improve the write efficiency of the array by executing a "full-stripe write," where the system writes data to every block in a stripe at once. In the example where there are 4 primary disks and 2 parity disks, a single full-stripe write only requires 1.5× operations, i.e., writing data to the 4 blocks of the primary disks requires writing to the 2 blocks of the parity disks.

SUMMARY

This specification generally describes a storage system that can utilize a meta object and a capacity object to execute full-stripe writes of user data to the capacity object.

In particular, an external system, e.g., a user or user system, can store data by sending a write request to the meta object of the storage system. The meta object can store the data until the amount of data stored by the meta object, cumulatively across one or more different write requests, exceeds a certain threshold. Once the threshold is exceeded, the meta object can execute one or more full-stripe writes to the capacity object. If a portion of the data in the full-stripe write is replacing old data that is already stored in the capacity object, then instead of overwriting the old data in an inefficient single-block write, the capacity object can execute the full-stripe write and update a logical map that tracks the location of the most recent version of each piece of data. Then, when an external system submits a read request for the data, the capacity object can determine, using the logical map, the location of the most recent version of the requested data, and retrieve the requested data and provide it to the external system.

The capacity object can include multiple primary disks and multiple parity disks. The capacity object can also be divided into multiple segments. When one of the primary disks fails, the storage system can determine which segments of the capacity object have been changed since the primary disk failure, and execute a resynchronization technique that ensures data integrity for each of the determined segments of the capacity object. In particular, the storage system can maintain a segment usage table that stores, for each segment of the capacity object, a transaction ID representing the time at which the segment was most recently written to. When a disk of the capacity object fails, the storage system can record the time at which the disk failed. Then, when the capacity object becomes available again, the storage system can determine, from the segment usage table, which segments of the failed disk need to be resynchronized. Thus, the storage system can determine which segments have a transaction ID that is larger than the timestamp at which the disk failed, thereby determining that the corresponding segments of the failed disk have stale data.

Particular embodiments of the subject matter described in this specification can be implemented so as to realize one or more of the following advantages.

Using techniques described in this specification, a storage system can exclusively, or almost exclusively, perform full-stripe writes to an array of primary and parity disks, e.g., a RAID-6 array. Compared to performing single-block writes, full-stripe writes can reduce latency of the storage system and can be significantly more computationally efficient.

Using techniques described in this specification, a storage system can write data to a RAID-6 array without having to perform a second write for a checksum of the data. Instead, the storage system can create, using the same write request that writes the data to the RAID-6 array, a segment summary that can be used to verify the correctness of the data.

In some conventional techniques, when a disk of a storage system fails, the system creates a bitmap that the system uses to track which portions of the storage system have been updated since the failure of the disk. In such a system, each bit in the bitmap corresponds to a particular group of consecutive addresses in the storage system. Initially all of the bits are set to be "0," and whenever any one of the addresses in a particular group are updated, the system changes the bit corresponding to the particular group to "1." Typically, the granularity of the bitmap is large; that is, a single bit corresponds to a large group of consecutive addresses in the storage system. Thus, if the storage system updates only one or a few addresses in the group of addresses, the system does not know which specific addresses where updated and must resynchronize the entire group of addresses, which can be very computationally inefficient. Updating the bitmap when a new write is made to the storage system imposes an additional computational cost. Furthermore, the bitmap can be large, and therefore maintaining the bitmap imposes a memory cost.

Using techniques described in this specification, a data recovery subsystem can resynchronize a disk of the capacity object that has failed, without data loss and without maintaining a bitmap. In particular, the data recovery system can use a segment usage table that is already maintained and used by the storage system to determine which segments are available to write data to. Consequently, using the segment usage table by the data recovery system imposes no marginal storage memory cost. Furthermore, because the techniques described in this specification enable a storage system to perform exclusively, or almost exclusively, full-stripe writes, the data recovery system will typically not resynchronize segments that only experienced minor updates while the disk was offline. Thus, the data recovery system will not waste a lot of time and computational resources updating an entire segment when only a small portion of the segment truly needs to be updated.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for resynchronizing data in a storage subsystem.

Figure 1:
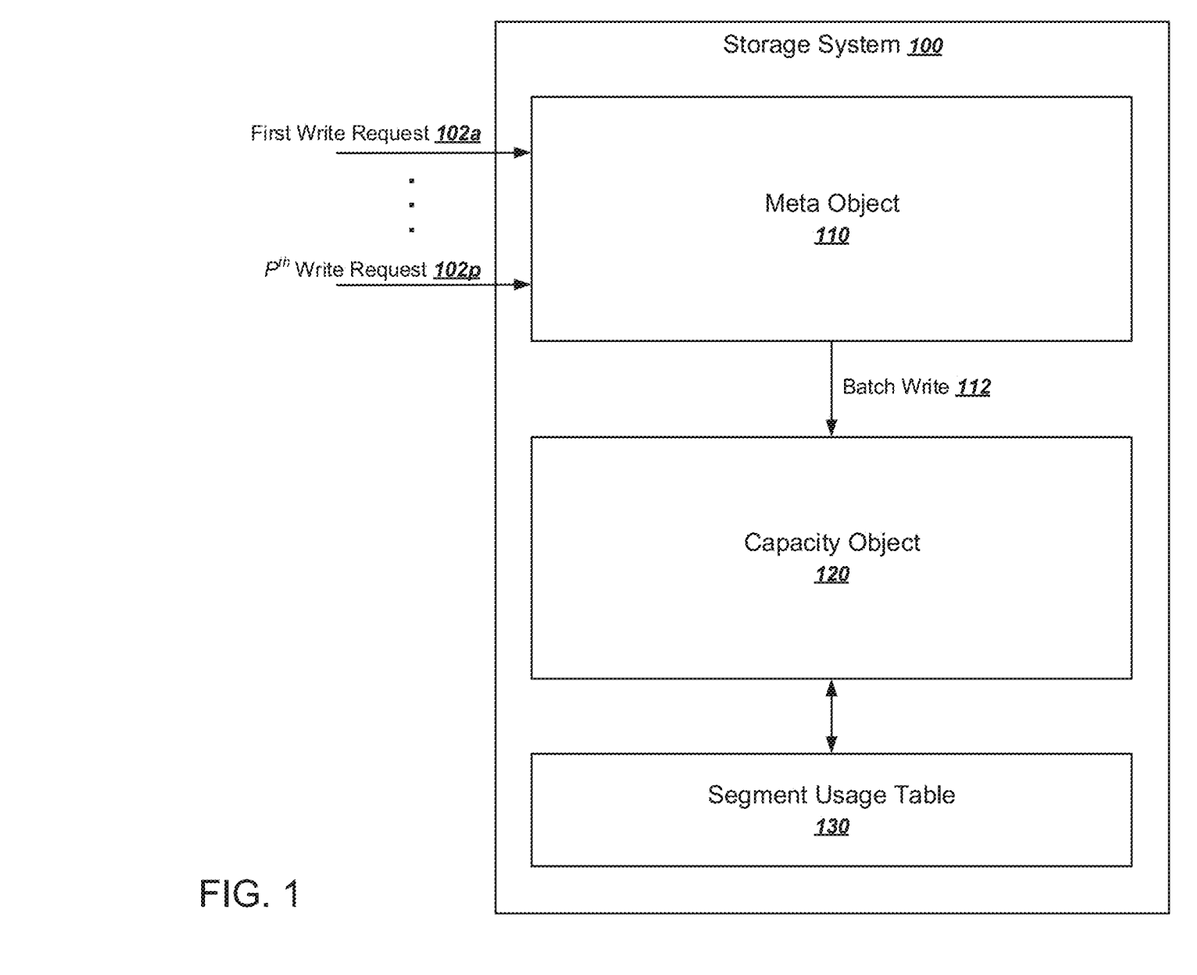
FIG. 1 is a diagram of an example storage system.

FIG. 1 is a diagram of an example storage system 100. The storage system 100 includes a meta object 110, a capacity object 120, and a segment usage table 130.

The storage system 100 is configured to receive requests to write data to the storage system 100. For example, the storage system might receive p write requests 102a-p, each associated with a different piece of data that is to be stored in the storage system 100. The write requests 120a-p can be received from a computing device, e.g., from a user device or from a virtual machine on behalf of a user or user system.

Each time the storage system 100 receives a write request 102i, the data associated with the write request 102i is written to the meta object 110, e.g., into a RAID-1 array in the meta object 110. When the amount of data that has been written to the meta object 110, cumulatively over one or more different write requests, surpasses a particular threshold, then the meta object can execute a batch write 112 to the capacity object that includes all of the data that has been written to the meta object 110 since the previous batch write 112. That is, the meta object 110 sends all of the data it has received across one or more write requests 102a-p to the capacity object 120. In some cases, the meta object 110 can then erase the data in order to receive more write requests 102i. Typically the capacity object 120 is significantly larger than the meta object 110, e.g., 10×, 100×, or 1000× as large. Meta objects are discussed in more detail below in reference to FIG. 2.

Figure 3A:
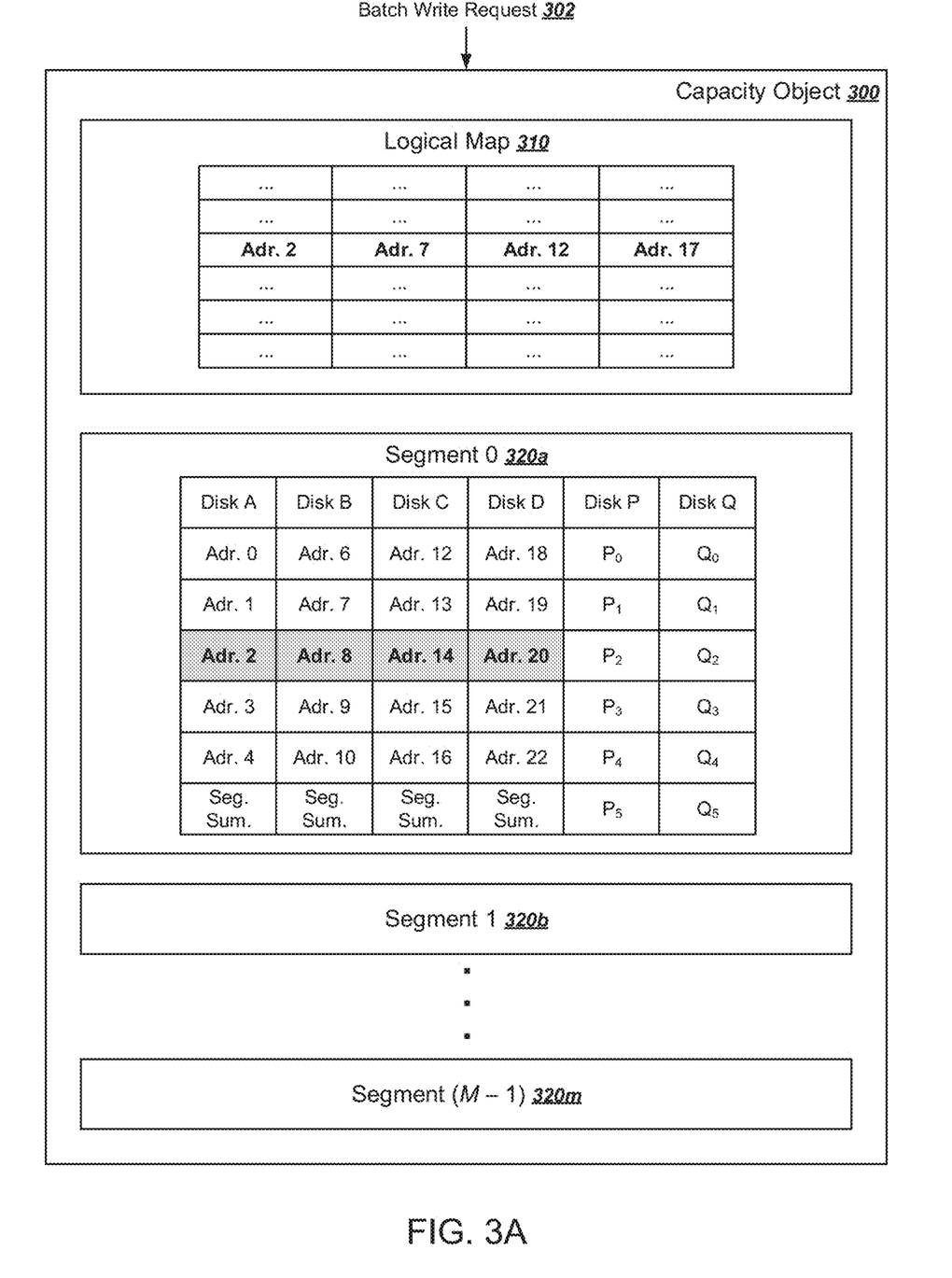
FIGS. 3A and 3B are diagrams of an example capacity object.

The capacity object 120 can receive the batch write 112 and write the data for long-term storage, e.g., write the data to a RAID-6 array in the capacity object. The batch write 112 can be a full-stripe write to the RAID-6 array in the capacity object. If the batch write 112 includes new data that is to replace older data that is already stored in the capacity object 120, the capacity object 120 can execute a new full-stripe write and update a logical map that identifies the current location of every stored data item, instead of executing one or more single-block writes to overwrite the older data. Capacity objects are discussed in more detail below in reference to FIG. 3.

The capacity object 120 can include multiple "segments." That is, each disk of the capacity object 120 can be segmented into blocks of consecutive addresses, with corresponding blocks in each disk constituting a segment of the capacity object 120. When the capacity object 120 executes the batch write 112, some of the data in the batch write 112 might replace older data that is stored in other segments of the capacity object 120. After the capacity object 120 executes the batch write 112 and updates the logical map, the older data in the other segments is considered "stale." Stale data is data that has since been replaced with newer data in the logical map but that has not yet been erased or overwritten. Conversely, "live" data is data that is still in use, i.e., that still represents the latest version of the data.

The segment usage table 130 can track how much data in each segment of the capacity object 120 is live and how much is stale. That is, for each segment in the capacity object 120, the segment usage table 130 can identify i) how much of the data is still being used by the system that submits the write requests 120a-p, and ii) how much of the data has since been replaced with newer data stored in another segment. Segment usage tables are discussed in more detail below in reference to FIG. 4.

Figure 2:
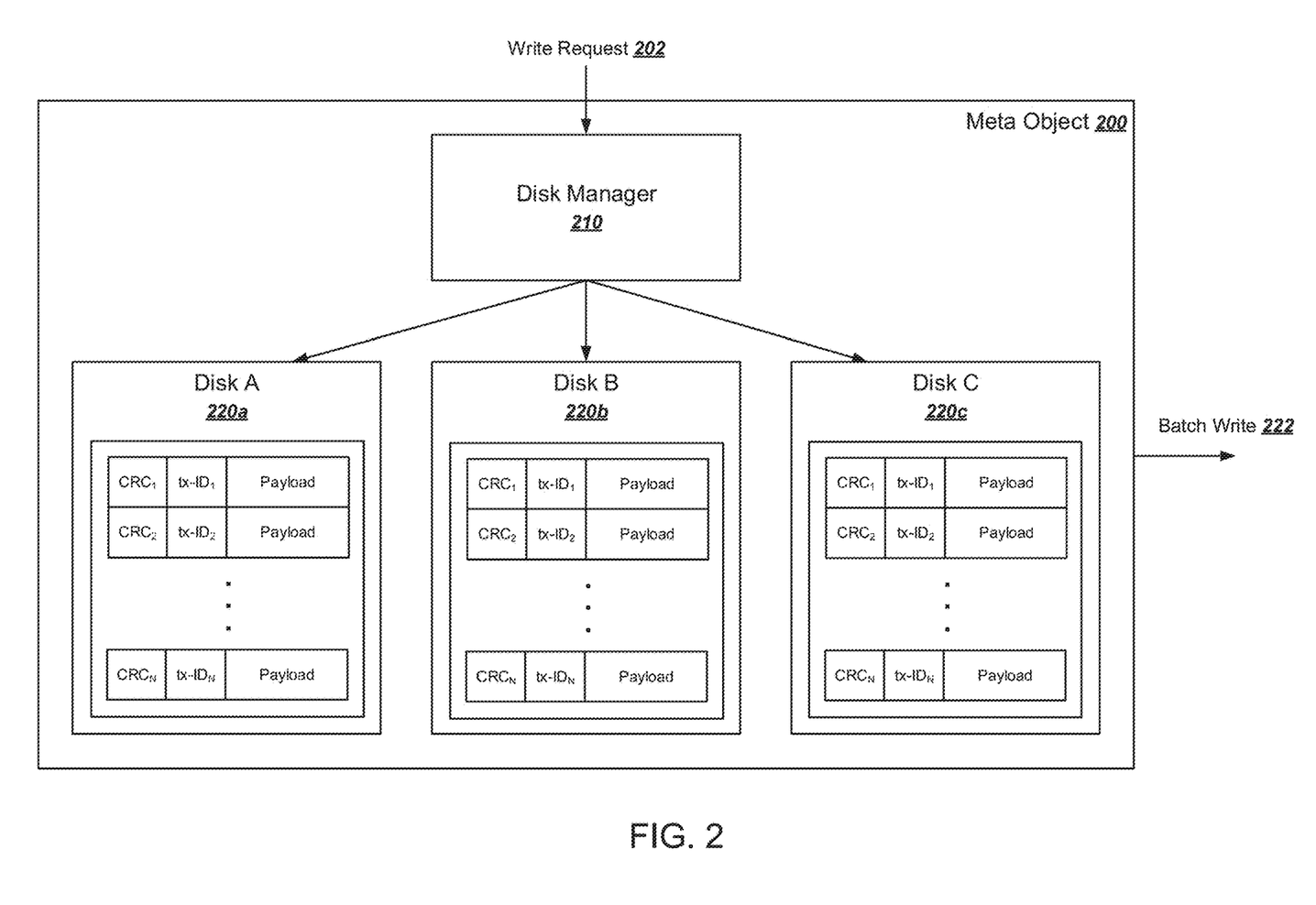
FIG. 2 is a diagram of an example meta object.

FIG. 2 is a diagram of an example meta object 200. The meta object 200 can be part of a storage system, e.g., the storage system 100 shown in FIG. 1, that includes the meta object 200 and a capacity object. The meta object 200 includes a disk manager 210 and three disks 220a-c. In some implementations, the three disks 220a-c are mirrored disks that make up a RAID-1 array.

The meta object 200 is configured to receive a write request 202 to write data to the storage system. The disk manager 210 can write the data to each of the disks 220a-c. This provides redundancy so that if any two of the disks fail, the meta object 200 can still recover the data. Moreover, the meta object 200 can resynchronize the failed disk when it comes back online.

Each time the disk manager 210 writes data to the disks 220a-c, the disk manager can write a copy of the same meta data block to each disk 220a-c, e.g., copies 224a-c of meta data block 224. Each meta data block can include a data integrity check, a transaction ID, and the data payload itself. The meta object 200 can use the data integrity check (e.g., a checksum value such as a cyclic redundancy check (CRC) value, a hash value, or a data fingerprint value) to ensure that the payload has not been corrupted. The transaction ID can identify the time at which the disk manager 210 wrote the data to the disk; that is, transaction IDs can be strictly increasing with time. The data payload can include the data that is associated with the write request 202.

When the meta object 200 receives a cumulative amount of data, across one or more write requests 202, that exceeds a particular threshold, then the meta object 200 can execute a batch write 222 to the capacity object of the storage system, sending each meta data block stored in the meta object 200 to the capacity object. In some implementations, the meta object 200 can perform one or more integrity checks on the data before performing the batch write 222. For example, the meta object 200 can determine, for each meta data block, whether the data stored in the three disks 220*a-c* is the same. As another example, the meta object 200 can determine, for each meta data block, if the data integrity check of the meta data block matches the associated data payload.

After sending the batch write 222 to the capacity object, the meta object 200 can free the storage space formerly used to store the corresponding meta data blocks of the batch write 222 to write new data associated with new write requests 202. For example, the meta object 200 can delete the corresponding meta data blocks from the three disks 220*a-c*. As another example, the meta object 200 can mark the corresponding meta data blocks as available to be overwritten by new data.

Figure 3B:
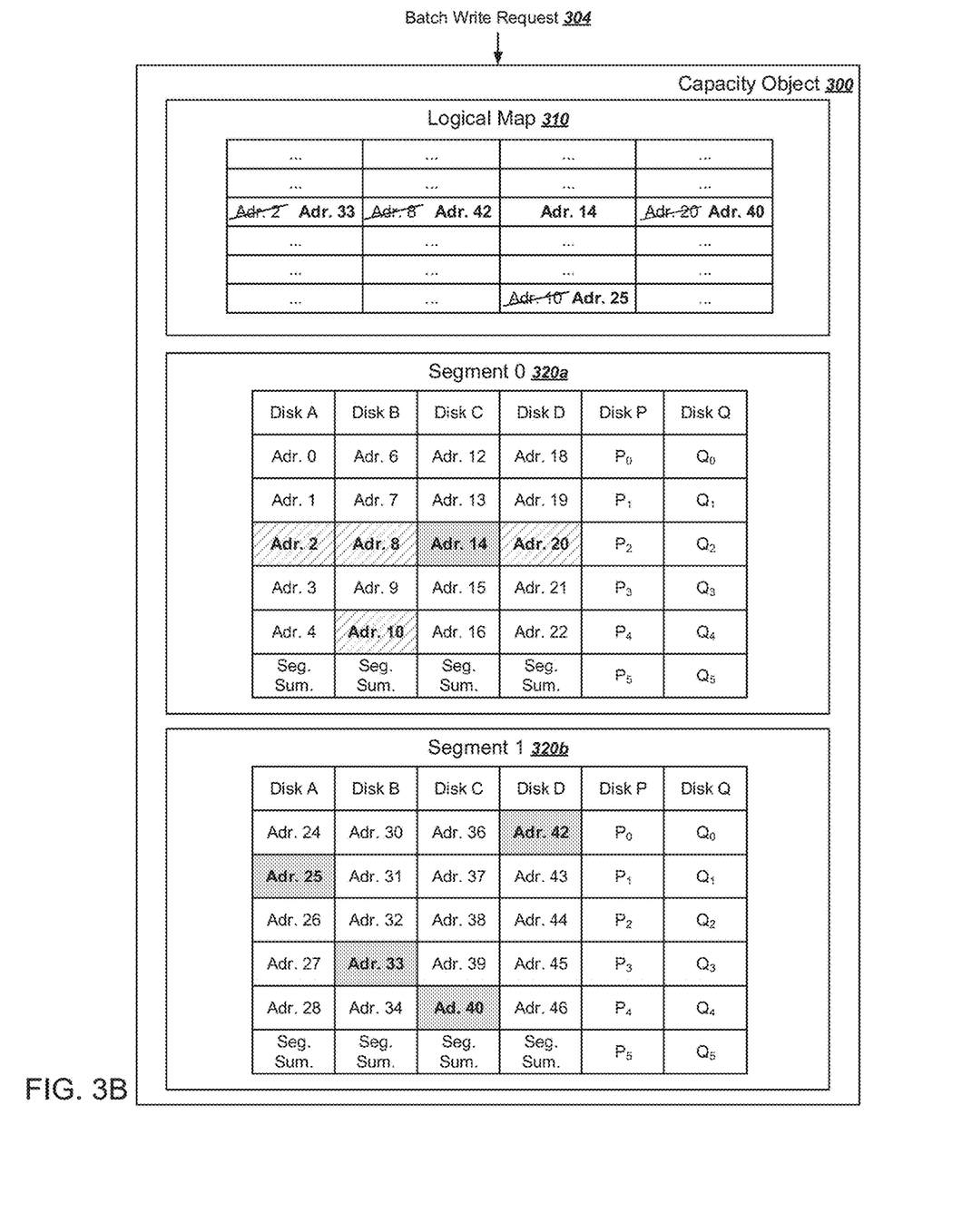

FIGS. 3A and 3B are diagrams of an example capacity object 300. The capacity object 300 can be part of a storage system, e.g., the storage system 100 depicted in FIG. 1, that includes a meta object and the capacity object 300.

The capacity object 300 includes a logical map 310 and M segments 320*a-m*. In the example shown in FIGS. 3A and 3B, the M segments 320*a-m* are segments of six disks in a RAID-6 array, where four of the six disks (disks A, B, C, and D) are primary disks and two of the six disks (disks P and Q) are parity disks. That is, each segment 320*i* represents a list of consecutive addresses of the six disks. As a particular example, each segment can include 768 KB total storage space, including 128 KB in each of the six disks. In this example, each segment has 512 KB of usable storage space, i.e., 128 KB in each of the primary disks.

In some implementations, the four of the six disks that are used as primary disks and the two of the six disks that are used as parity disks are "cycled" in each segment of the capacity object 300. That is, the capacity object 300 can use a portion of a disk corresponding to a first segment to store primary data, and a different portion of the same disk corresponding to a second segment to store parity data. In some other implementations, the capacity object 300 can use the same four disks as primary disks and the same two disks as parity disks for all segments of the capacity object 300.

As illustrated in the example of FIG. 3A, the capacity object 300 is configured to receive a batch write request 302 to store data in the capacity object 300. For example, the batch write request 302 can come from a meta object of the storage system of the capacity object 300, e.g., the meta object 200 depicted in FIG. 2. In some implementations, each batch write request includes the same amount of data as can be stored in a single segment 320*i*; that is, the stripe size of the capacity object 300 is equal to the size of a segment 320*a-m*. In some other implementations, each batch write request includes the same amount of data as can be stored in one stripe of a segment 320*i*; that is, the stripe size of the capacity object 300 is less than the size of a segment 320*a-m*. In any case, the capacity object 300 can be configured to receive batch write requests that represent full-stripe writes, which, as discussed above, is more efficient than writing to individual blocks of respective disks of a segment.

Upon receiving the batch write request 302, the capacity object 300 can determine the segment to which to write the data associated with the batch write request 302. For example, the capacity object 300 can use a segment usage table that identifies which segments are available to receive new data. Segment usage tables are discussed in more detail below in reference to FIG. 4.

In the example illustrated in FIG. 3A, the capacity object 300 can determine to write the data to the first segment 320*a*. That is, the capacity object 300 can place the data associated with the batch write request 302 into the storage addresses of the first segment 320*a*. As a particular example, segments 0 through (M−1) could all be empty, and thus the capacity object 300 chose the first available segment, namely the first segment 320*a*. As another particular example, the first segment 320*a* could be completely or partially available after the first segment 320*a* was reclaimed through garbage collection; that is, a garbage collection system of the capacity object 300 could have determined that the data in the first segment 320*a* was stale, and removed the stale data or marked it as available to be overwritten.

In some implementations, the capacity object 300 places the data into a physical storage space corresponding to segment 320*a*. In some other implementations, the first segment 320*a* is itself a virtual storage space managed by a lower-level system, and so the capacity object 300 provides the data to the lower-level system that manages the corresponding physical storage space. While only five stripes of the first segment 320*a* are illustrated in FIG. 3A, in practice the first segment 320*a* can have many more stripes.

In some implementations, when the capacity object 300 places the data into the first segment 320*a*, the capacity object 300 can also compute the values for the parity disks P and Q. That is, the batch write request 302 can include only the primary data that is to be placed into disks A, B, C, and D, which the capacity object 300 can process to determine the parity values that are to be placed into disks P and Q. In some other implementations, the batch write request 302 includes the parity values to be stored in disks P and Q.

The capacity object 300 can further generate a segment summary for each disk. The segment summary for a primary disk describes the data that is in the portion of the primary disk corresponding to the segment. For example, the segment summary can include a data integrity check, e.g., a CRC value, a hash of the data in the segment, a size of the segment, etc. Typically, this metadata takes up a small amount of space compared to the segment itself, e.g. 0.1%, 0.5%, 1%, 5%, 10%, or 20% of the storage space. In the implementations in which the stripe size of the capacity object 300 is equal to the size of each segment 320*a-m*, the capacity object 300 can compute the segment summaries of a particular segment each time the capacity object 300 executes a full-stripe write to the particular segment. In the implementations in which the stripe size of the capacity object 300 is less than the size of each segment 320*a-m*, the capacity object 300 can re-compute the segment summaries of a particular segment each time the capacity object 300 executes a full-stripe write to the particular segment, using the data in each of the stripes of the segment. The segment summary for a parity disk can be the parity values calculated from the segment summaries of the primary disks. The segment summaries of a particular segment can be stored in addresses of the particular segment; for example, as depicted in FIG. 3A, the segment summaries are stored in Addresses 5, 11, 17, and 23 of the first segment 320*a*.

The logical map 310 characterizes, for each piece of data included in the batch write requests received by the capacity object 300, the location of the piece of data in a respective segment of the capacity object 300. In the example depicted in FIGS. 3A and 3B, there is a single logical map 310 that applies to every segment 320*a-m* in the capacity object 300. In some implementations, the logical map 310 is stored in 'logical map pages' of the capacity object 300. In some other implementations, the logical map 310 is stored in a meta object of the storage system of the capacity object 300.

The logical map 310 is a map between i) the logical addresses of the capacity object 300, i.e., the addresses that are exposed to a system that retrieves data from the capacity object 300, and ii) the physical addresses of the segments of the capacity object 300. As noted above, in some implementations, the physical addresses of the capacity object 300 are themselves logical addresses of a lower-level system that manages the actual physical machines that store the data. For clarity, the logical map 310 in FIGS. 3A and 3B is depicted as a table; however, in general the logical map 310 can be stored as any indexing structure that can map the logical addresses of the capacity object 300 to physical addresses. As a particular example, the logical map 310 can be stores as a B-tree.

Thus, when a batch write 302 includes new data that is to replace existing data that is already being stored in the capacity object 300, the capacity object does not have to execute a single-block write to the physical addresses of the segment 320*i* that is currently storing the existing data, which can be computationally expensive. Instead, the capacity object 300 can execute a full-stripe write of all of the data in the batch write request 302 to a new segment of the capacity object 300, and simply update the logical map 310 to list the new location of the data instead of the existing location of the data.

In the example illustrated in FIG. 3A, all of the data in the batch write request 302 is new data—that is, the data in the batch write request 302 is not replacing data that is already stored in the capacity object 300. Therefore, the capacity object can generate new entries in the logical map 310 that identify where the new data is located in the capacity object 300. In particular, the capacity object 300 can execute a full-stripe write that writes new data to the physical addresses 2, 8, 14, and 20 of the first segment 320*a*, and generate entries in the logical map 310 that map the logical addresses of the new data to those addresses.

In some implementations, e.g., in the implementations in which the stripe size of the capacity object 300 is equal to the size of each segment 320*a-m*, the capacity object 300 executes a full-stripe write to the entire first segment 320*a*, i.e., writing to each address 0 through 22.

In some implementations in which the stripe size of the capacity object 300 is less than the size of each segment 320*a-m*, the capacity object 300 executes full-stripe writes in chronological order of the stripes in a segment. That is, when the capacity object 300 executes the full-stripe write to the stripe composed of addresses 2, 8, 14, and 20, the first segment 320*a* includes live data in the stripe composed of addresses 1, 7, 13, and 19 but does not include live data in the stripe composed of addresses 3, 9, 15, and 21. Then, when the capacity object 300 receives a new batch write request 302, the capacity object 300 might write to the stripe composed of addresses 3, 9, 15, and 21.

In some other implementations in which the stripe size of the capacity object 300 is less than the size of each segment 320*a-m*, the capacity object 300 does not necessarily execute full-stripe writes in chronological order of the stripes in a segment. That is, when the capacity object 300 executes the full-stripe write to the stripe composed of addresses 2, 8, 14, and 20, the first segment 320*a* might not include live data in the stripe composed of addresses 1, 7, 13, and 19, and/or might include live data in the stripe composed of addresses 3, 9, 15, and 21. For example, if the first segment 320*a* was partially reclaimed by a garbage collection system if the capacity object 300, the stripe composed of addresses 2, 8, 14, and 20, might have been reclaimed and thus does not include any live data, but the stripe composed of addresses 3, 9, 15, and 21 might not have been reclaimed and thus does include live data.

As depicted FIG. 3B, the capacity object 300 can receive another batch write request 304. As before, the capacity object 300 can determine the segment to which to write the data associated with the batch write request 304. In the example illustrated in FIG. 3B, the capacity object 300 can determine to write the data to the second segment 320*b*. Note that, in general, the capacity object 300 does not have to write to segments sequentially; that is, the capacity object 300 could have written to any segment of the capacity object 300 after writing to the first segment 320*a*.

In the example illustrated in FIG. 3B, the batch write request 304 includes four blocks of data that are to replace existing blocks of data. Namely, the batch write request 304 includes three blocks of data that are to replace the data of batch write request 302 previously written to addresses 2, 8, and 20. Additionally, the batch write request 304 includes a block of data that is to replace data previously written to address 10 in the first segment 320*a*.

Therefore, when the capacity object 300 writes the data associated with the batch write request 304 to the second segment 320*b*, the capacity object 300 also updates the logical map 310 to identify the four new locations for the new blocks of data that replace the existing blocks of data. Namely, the logical map now identifies the addresses 33, 42, 25, and 40 of the second segment 320*b* as the new location for the four blocks of data, replacing the addresses 2, 8, 10, and 20 of the first segment 320*a*. The data stored in addresses 2, 8, 10, and 20 of the first segment 320*a* is not erased or overwritten in the example depicted in FIG. 3B; rather, it simply become "stale." The capacity object 300 might track the fact that these addresses have become stale in a segment usage table of the capacity object 300. Segment usage tables are discusses in more detail below in reference to FIG. 4.

Note that the new data does not have to be stored sequentially in the second segment 320*b*, even though it may be sequential in the logical map 310. That is, the new data can be only a portion of the data in the batch write request 304, so that the capacity object 300 can write other data in between the new data (e.g., data in addresses 34, 36, etc. between addresses 33 and 42 even though addresses 33 and 42 are sequential in the logical map 310).

Note also that the new data does not have to be written to the same disk as the stale data that is replaces (e.g., the data that replaces address 2 of Disk A is written to address 33 of Disk B).

Executing the batch write request 304 in the way described above can be much more efficient than individually overwriting each stale piece of data in the first segment 320*a* with the corresponding new piece of data. For example, overwriting the data in address 10 of the first segment would require the capacity object 300 to read the full corresponding stripe between address 4 and $Q_4$, compute new parity values for $P_4$ and $Q_4$ using the new data, and rewrite the stripe. Additionally, the capacity object 300 might have to read, update, and rewrite the segment summary of Disk B to reflect the new value in address 10. Using the technique described above, the capacity object 300 can write the new data in a single full-stripe write, and simply update the logical map 310 to reflect the change.

After the capacity object 300 updates the logical map 310 and executes the batch write request 304, if an external system submits a request to retrieve the four updated blocks of data, the capacity object 300 can determine, from the logical map 310, the locations of the most recent versions of the data (namely, addresses 33, 42, 25, and 40 of the second segment 320b) and retrieve the data from the determined locations.

Figure 4:
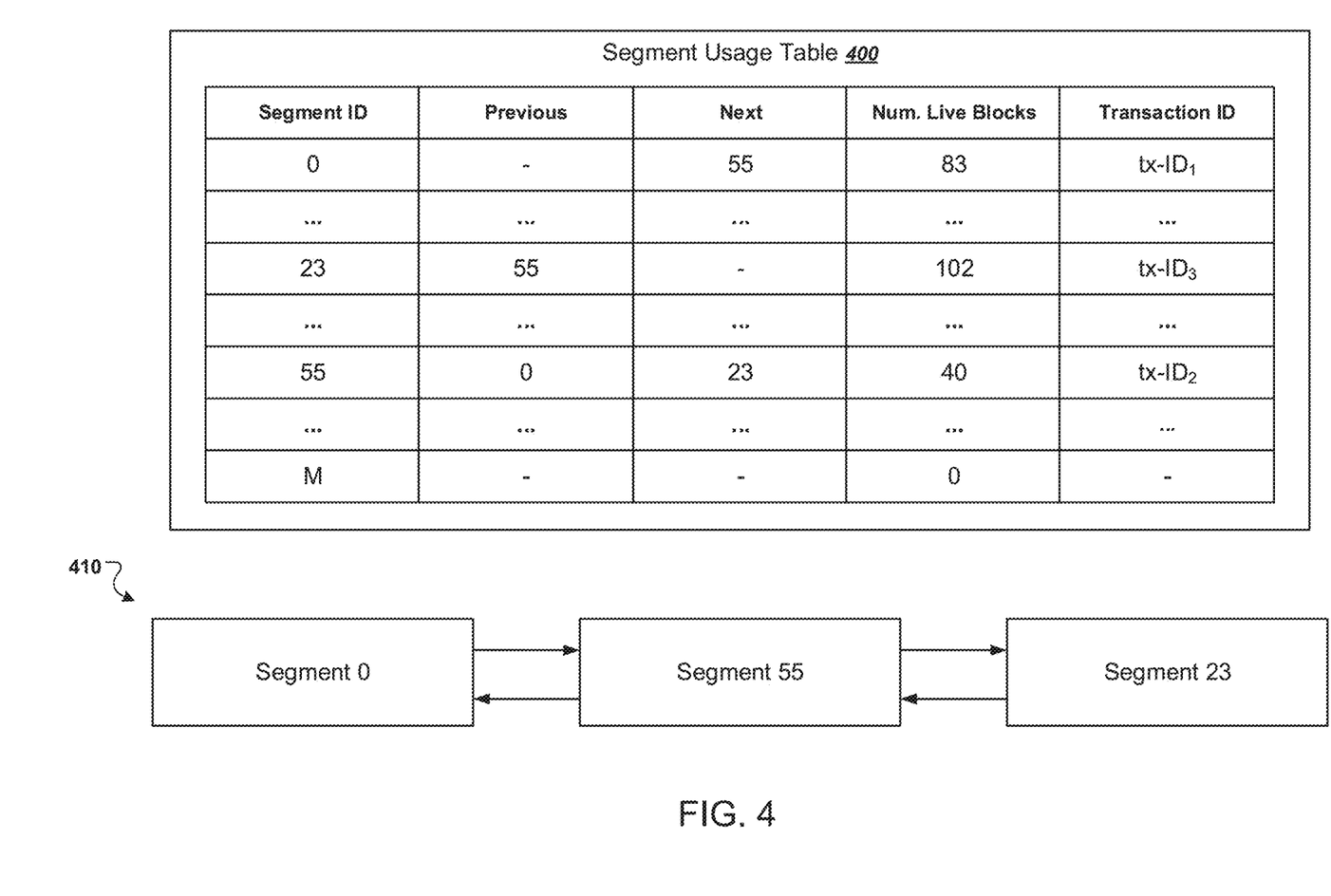
FIG. 4 is a diagram of an example segment usage table.

FIG. 4 is a diagram of an example segment usage table 400. The segment usage table 400 can be part of a storage system, e.g., the storage system 100 depicted in FIG. 1, that includes a meta object and a capacity object, where the availability of the respective segments of the capacity object is characterized by the segment usage table 400.

The segment usage table 400 includes a row for each segment of the capacity object of the storage system. The row corresponding to a particular segment can identify whether or not the segment currently has "live" data, i.e., data that has not since been updated in a more recent write to a later segment in the linked list of segments of the capacity object. While the segment usage table 400 uses a linked list to track the segments that are currently in use, in general a segment usage table can use any suitable data structure.

For each segment, the corresponding row in the segment usage table 400 lists i) a previous segment in a linked list of segments 410, ii) a next segment in the linked list of segments 410, iii) a number of live blocks, and iv) a transaction ID. The linked list of segments 410 includes every segment that currently stores live data. In some implementations, the linked list is a doubly-linked list, i.e., each segment in the linked list has a reference to both the "previous" and the "next" segment in the linked list, as depicted in FIG. 4. In some other implementations, the linked list is a singly-linked list, i.e., each segment in the linked list has a reference to only the "next" segment in the linked list.

In the example illustrated in FIG. 4, there are three segments of the capacity object corresponding to the segment usage table 400 that have live data: segment 0, segment 55, and segment 23. The "Num. Live Blocks" value for each segment in the linked list of segments 410 identifies the number of blocks in the segment that have live data; namely, segment 0 has 83 live blocks, segment 23 has 102 live blocks, and segment 55 has 40 live blocks. The "Transaction ID" value for each segment identifies the time at which the segment was most recently written to, i.e., how old the newest data in the segment is. Generally, because the storage system generally executes full-stripe writes to segments, the newest data in a segment is the data in the final stripe of the segment. The transaction IDs in the linked list of segments 410 are strictly increasing, because the linked list 410 defines the order in which the segments have been written to; therefore, the transaction ID of segment 0 is smaller than the transaction ID of segment 55, which is smaller than the transaction ID of segment 23.

When the capacity object receives a new write request associated with new data, the capacity object can use the segment usage table 400 to identify the segment in which to store the new data. For example, e.g., in storage systems where the stripe size is equal to the size of each segment, the capacity object can select a segment that is not currently in the linked list of segments 410, i.e., a segment that currently does not have any live blocks. In the example illustrated in FIG. 4, the $M^{th}$ segment is not in the linked list and therefore has 0 live blocks. As a result, the capacity object can write the new data to segment M and add segment M to the linked list 410, e.g., to the end of the linked list (i.e., after segment 23).

As another example, e.g., in store systems where the stripe size is smaller than the size of each segment, the capacity object can select a segment that is already in the linked list of segments (i.e., that has one or more live blocks) and that has more available blocks than are needed to store the new data, and write the new data to the selected segment. Generally, the selected segment includes full stripes of data that are available (i.e., full stripes that include no live data), and so the capacity object executes full-stripe writes of the new data to the selected segment. In this case, the capacity object can update the number of live blocks in the selected segment, and reorder the linked list 410 to reflect the fact that the selected segment is the most recent segment to have been updated; that is, if the selected segment was not the final segment in the linked list before writing the new data, then the capacity object can place the selected segment at the end of the linked list.

The segment usage table 400 in FIG. 4 includes every segment in the corresponding capacity object, including segments that have live data and therefore are in the linked list of segments and segments that do not have live data and therefore are not in the linked list of segments (e.g., segment M−1). In some other implementations, the segment usage table can only include segments that have live data, i.e., only include segments that are in the linked list of segments. In these implementations, the storage system can maintain a separate table that lists the segments of the capacity object that do not have live data, i.e., that are not yet in the linked list. Then, when the capacity object write data to one of the segments that are not yet in the linked list, the capacity object can remove the segment from the table listing segments that do not have live data, and add the segment to the segment usage table that tracks segments that do have live data.

Figure 5:
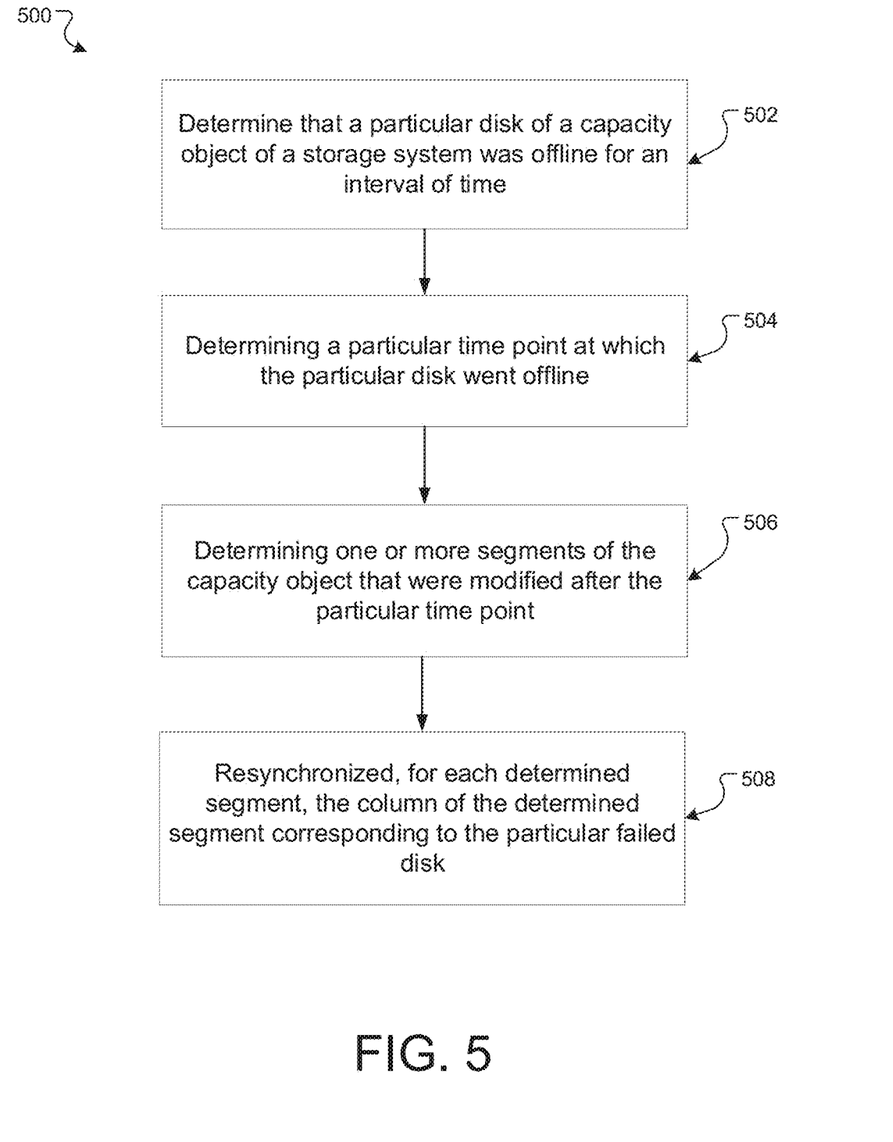
FIG. 5 is a flow diagram of an example process for resyncing data in a capacity object of a storage system.

FIG. 5 is a flow diagram of an example process 500 for resyncing data in a capacity object of a storage system. For convenience, the process 500 will be described as being performed by a system of one or more computers located in one or more locations. For example, a data recovery subsystem of a storage system, e.g., the storage system 100 depicted in FIG. 1, appropriately programmed in accordance with this specification, can perform the process 500.

The system determines that a particular disk of the capacity object of the storage system has failed (step 502). The capacity object can include multiple primary disks and multiple parity disks. In some implementations, the capacity object is a RAID-6 array that includes four primary disks and two parity disks. As described in FIG. 3, the disks are segmented into multiple segments, so that each segment includes, for each disk of the capacity object, a sequence of consecutive addresses of the disk.

The system determines that a particular disk of the capacity object was offline for an interval of time (step 502). That is, the system can determine that the particular disk temporarily failed, and thus that the particular disk must be resynchronized using the other disks of the capacity object so that each disk in the capacity object stores the most recent version of the data.

The system determines a particular time point at which the particular disk went offline (step 504). For example, the system can determine the particular time point using error logs that were generated by the particular disk. As another example, the system can record, when the particular disk fails, the timestamp at which the particular disk failed, so that when the particular disk comes back online the system can simply retrieve the recorded timestamp.

The system determines one or more segments of the capacity object that were modified after the particular time point (step 506). Specifically, the system uses a segment usage table, e.g., the segment usage table 400 depicted in FIG. 4, to determine the segments that were written to after the particular disk failed. For example, the system can determine each segment that has a transaction ID in the segment usage table that is larger than the transaction ID at the time the particular disk failed. As a particular example, the system can traverse a linked list of segments represented by the segment usage table to determine each segment that needs to be resynchronized. In some implementations, the system starts at the first segment in the linked list of segments, and continues to the next segment in the linked list until the system arrives at a particular segment whose transaction ID is larger than the transaction ID at the time the particular disk failed. Since transaction IDs in the linked list of segments are always increasing, this particular segment, and every segment after this particular segment in the linked list of segments, has been modified after the particular time point. In some other implementations, the system starts at the final segment in the linked list of segments, and continues to the previous segment until the system arrives at a particular segment whose transaction ID is smaller than the transaction ID at the time the particular disk failed; thus, the system can determine that every traverses segment should be resynchronized.

Identifying the segments having transaction IDs greater than the transaction ID at the time the particular disk failed provides the system with each segment that needs to be resynchronized, since all of those segments were added after the particular disk failed. Typically, the capacity object only executes full-stripe writes; thus, the segments determined by the system typically include only data that has been added after the particular disk went offline. Consequently, the determined segments typically do not include any data that the particular disk already stores, and so no computational resources are wasted resynchronizing data that is already up-to-date.

The system resynchronizes, for each segment, the column of the segment corresponding to the particular disk (step 508). Resynchronizing only the segments that need to be resynchronized because they contain stale data can be significantly more computationally efficient than resynchronizing every segment of the particular disk.

As a particular example, the capacity object can be a RAID-6 array with four primary disks and two parity disks. If the failed disk is one of the primary disks, the system can, for each determined segment, read the corresponding segments in each of the other primary disks and one or both of the parity disks, and use the obtained segments to generate the synchronized segment for the failed primary disk. The system can then write the generated segment to the corresponding addresses in the failed primary disk. If the failed disk is one of the parity disks, the system can, for each determined segment, read the corresponding segments in each of the primary disks, and use the obtained data to generate the synchronized parity segment. The system can then write the generated segment to the corresponding addresses in the failed parity disk.

Embodiments of the subject matter described in this specification include computer systems, apparatus, and computer programs recorded on one or more computer storage devices, each configured to perform the actions of the described methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; solid state drives, NVMe devices, persistent memory devices, magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising: a capacity object comprising a plurality of segments, wherein each segment comprises: a primary column corresponding to each of a plurality of primary disks, wherein each primary column comprises a plurality of primary storage blocks; and a parity column corresponding to each of a plurality of parity disks, wherein each parity column comprises a plurality of parity storage blocks; a segment usage table identifying a linked list of particular segments of the system that are currently in use, the segment usage table comprising, for each of the particular segments: data identifying a previous segment in the linked list; data identifying a next segment in the linked list; and a transaction ID of the particular segment; and a data recovery subsystem configured to perform operations comprising: determining that a particular disk of the capacity object was offline for an interval of time; determining a particular time point at which the particular disk went offline; determining one or more first segments of the capacity object that were modified after the particular time point, wherein determining one or more first segments comprises determining each segment of the segment usage table having a transaction ID that is larger than the particular time point; and resynchronizing, for each first segment, the column of the first segment corresponding to the particular disk.

Embodiment 2 is the system of embodiment 1, wherein the data recovery subsystem is configured to perform operations further comprising: recording, when the particular disk of the capacity object goes offline, the particular time point at which the particular disk went offline.

Embodiment 3 is the system of any one of embodiment 1 or 2, wherein determining one or more first segments of the capacity object that were modified after the particular time point comprises traversing the linked list from the first segment in the linked list until identifying a segment in the linked list that has a transaction ID that is larger than the particular time point.

Embodiment 4 is the system of any one of embodiments 1 or 2, wherein determining one or more first segments of the capacity object that were modified after the particular time point comprises traversing the linked list from the final segment in the linked list until identifying a segment in the linked list that has a transaction ID that is smaller than the particular time point.

Embodiment 5 is the system of any one of embodiments 1-4, wherein: the particular disk is a primary disk of the capacity object; and resynchronizing the column of a first segment corresponding to the particular disk comprises: reading the columns of the first segment corresponding to i) each of the other primary disks of the capacity object and ii) one or more of the parity disks of the capacity object; and resynchronizing the column of the first segment corresponding to the particular disk using the read data.

Embodiment 6 is the system of any one of embodiments 1-4, wherein: the particular disk is a parity disk of the capacity object; and resynchronizing the column of a first segment corresponding to the particular disk comprises: reading the columns of the first segment corresponding to each of the primary disks of the capacity object; and resynchronizing the column of the first segment corresponding to the particular disk using the read data.

Embodiment 7 is the system of any one of embodiments 1-6, wherein the segment usage table further comprises, for each of the particular segments that are currently in use, data identifying a number of storage blocks of the particular segment that are currently in use.

Embodiment 8 is a method comprising the operations of any one of embodiments 1-7.

Embodiment 9 is a computer storage medium encoded with a computer program, the program comprising instructions that are operable, when executed by data processing apparatus, to cause the data processing apparatus to perform the operations of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes described do not necessarily require the particular order shown, or sequential order, to achieve desirable results. In certain implementations, multitasking and parallel processing can be advantageous.

What is claimed is:

1. A system comprising:
  a capacity object comprising a plurality of segments, wherein each segment comprises:
    a primary column corresponding to each of a plurality of primary disks, wherein each primary column comprises a plurality of primary storage blocks; and
    a parity column corresponding to each of a plurality of parity disks, wherein each parity column comprises a plurality of parity storage blocks;
  a segment usage table identifying a list of particular segments of the capacity object that are currently in use, the segment usage table comprising, for each of the particular segments, a transaction ID of the particular segment, wherein the segment usage table further comprises, for each of the particular segments that are currently in use, data identifying a number of storage blocks of the particular segment that are currently in use; and
  a data recovery subsystem configured to perform operations comprising:
    determining that a particular disk of the capacity object was offline for an interval of time;
    determining a particular time point at which the particular disk went offline;
    determining one or more first segments of the capacity object that were modified after the particular time point, wherein determining one or more first segments comprises determining each segment of the segment usage table having a transaction ID that is larger than the particular time point; and
    resynchronizing, for each first segment, the column of the first segment corresponding to the particular disk.

2. The system of claim 1, wherein the data recovery subsystem is configured to perform operations further comprising:
  recording, when the particular disk of the capacity object goes offline, the particular time point at which the particular disk went offline.

3. The system of claim 1, wherein:
  the list of particular segments of the capacity object that are currently in use in the segment usage table is a linked list that includes, for each of the particular segments:
    data identifying a previous segment in the linked list, and
    data identifying a next segment in the linked list; and
  determining one or more first segments of the capacity object that were modified after the particular time point comprises traversing the linked list from the first segment in the linked list until identifying a segment in the linked list that has a transaction ID that is larger than the particular time point.

4. The system of claim 1, wherein:
  the list of particular segments of the capacity object that are currently in use in the segment usage table is a linked list that includes, for each of the particular segments:

data identifying a previous segment in the linked list, and
data identifying a next segment in the linked list; and
determining one or more first segments of the capacity object that were modified after the particular time point comprises traversing the linked list from the final segment in the linked list until identifying a segment in the linked list that has a transaction ID that is smaller than the particular time point.

5. The system of claim 1, wherein:
the particular disk is a primary disk of the capacity object; and
resynchronizing the column of a first segment corresponding to the particular disk comprises:
reading the columns of the first segment corresponding to i) each of the other primary disks of the capacity object and ii) one or more of the parity disks of the capacity object; and
resynchronizing the column of the first segment corresponding to the particular disk using the read data.

6. The system of claim 1, wherein:
the particular disk is a parity disk of the capacity object; and
resynchronizing the column of a first segment corresponding to the particular disk comprises:
reading the columns of the first segment corresponding to each of the primary disks of the capacity object; and
resynchronizing the column of the first segment corresponding to the particular disk using the read data.

7. A method comprising:
determining that a particular disk of a capacity object of a storage system was offline for an interval of time, wherein the capacity object comprises a plurality of segments, and wherein the storage system comprises a segment usage table identifying a list of particular segments of the capacity object that are currently in use, the segment usage table comprising, for each of the particular segments, a transaction ID of the particular segment, wherein the segment usage table further comprises, for each of the particular segments that are currently in use, data identifying a number of storage blocks of the particular segment that are currently in use;
determining a particular time point at which the particular disk went offline;
determining one or more first segments of the capacity object that were modified after the particular time point, wherein determining one or more first segments comprises determining each segment of the segment usage table having a transaction ID that is larger than the particular time point; and
resynchronizing, for each first segment, a portion of the particular disk corresponding to the first segment.

8. The method of claim 7, further comprising recording, when the particular disk of the capacity object goes offline, the particular time point at which the particular disk went offline.

9. The method of claim 7, wherein:
the list of particular segments of the capacity object that are currently in use in the segment usage table is a linked list that includes, for each of the particular segments:
data identifying a previous segment in the linked list, and
data identifying a next segment in the linked list; and
determining one or more first segments of the capacity object that were modified after the particular time point comprises traversing the linked list from the first segment in the linked list until identifying a segment in the linked list that has a transaction ID that is larger than the particular time point.

10. The method of claim 7, wherein:
the list of particular segments of the capacity object that are currently in use in the segment usage table is a linked list that includes, for each of the particular segments:
data identifying a previous segment in the linked list, and
data identifying a next segment in the linked list; and
determining one or more first segments of the capacity object that were modified after the particular time point comprises traversing the linked list from the final segment in the linked list until identifying a segment in the linked list that has a transaction ID that is smaller than the particular time point.

11. The method of claim 7, wherein:
the particular disk is a primary disk of the capacity object; and
resynchronizing the portion of particular disk corresponding to a first segment comprises:
reading i) portions of each primary disk of the capacity object corresponding to the first segment and ii) portions of one or more parity disks of the capacity object corresponding to the first segment; and
resynchronizing the portion of the particular disk corresponding to the first segment using the read data.

12. The method of claim 7, wherein:
the particular disk is a parity disk of the capacity object; and
resynchronizing the portion of particular disk corresponding to a first segment comprises:
reading portions of each primary disk of the capacity object corresponding to the first segment; and
resynchronizing the portion of the particular disk corresponding to the first segment using the read data.

13. One or more non-transitory computer storage media encoded with computer program instructions that when executed by a plurality of computers cause the plurality of computers to perform operations comprising:
determining that a particular disk of a capacity object of a storage system was offline for an interval of time, wherein the capacity object comprises a plurality of segments, and wherein the storage system comprises a segment usage table identifying a list of particular segments of the capacity object that are currently in use, the segment usage table comprising, for each of the particular segments, a transaction ID of the particular segment, wherein the segment usage table further comprises, for each of the particular segments that are currently in use, data identifying a number of storage blocks of the particular segment that are currently in use;
determining a particular time point at which the particular disk went offline;
determining one or more first segments of the capacity object that were modified after the particular time point, wherein determining one or more first segments comprises determining each segment of the segment usage table having a transaction ID that is larger than the particular time point; and
resynchronizing, for each first segment, a portion of the particular disk corresponding to the first segment.

14. The non-transitory computer storage media of claim 13, wherein the operations further comprise recording, when the particular disk of the capacity object goes offline, the particular time point at which the particular disk went offline.

15. The non-transitory computer storage media of claim 13, wherein:
the list of particular segments of the capacity object that are currently in use in the segment usage table is a linked list that includes, for each of the particular segments:
data identifying a previous segment in the linked list, and
data identifying a next segment in the linked list; and
determining one or more first segments of the capacity object that were modified after the particular time point comprises traversing the linked list from the first segment in the linked list until identifying a segment in the linked list that has a transaction ID that is larger than the particular time point.

16. The non-transitory computer storage media of claim 13, wherein:
the list of particular segments of the capacity object that are currently in use in the segment usage table is a linked list that includes, for each of the particular segments:
data identifying a previous segment in the linked list, and
data identifying a next segment in the linked list; and
determining one or more first segments of the capacity object that were modified after the particular time point comprises traversing the linked list from the final segment in the linked list until identifying a segment in the linked list that has a transaction ID that is smaller than the particular time point.

17. The non-transitory computer storage media of claim 13, wherein:
the particular disk is a primary disk of the capacity object; and
resynchronizing the portion of particular disk corresponding to a first segment comprises:
reading i) portions of each primary disk of the capacity object corresponding to the first segment and ii) portions of one or more parity disks of the capacity object corresponding to the first segment; and
resynchronizing the portion of the particular disk corresponding to the first segment using the read data.

18. The non-transitory computer storage media of claim 13, wherein:
the particular disk is a parity disk of the capacity object; and
resynchronizing the portion of particular disk corresponding to a first segment comprises:
reading portions of each primary disk of the capacity object corresponding to the first segment; and
resynchronizing the portion of the particular disk corresponding to the first segment using the read data.

* * * * *